United States Patent
Jun et al.

(10) Patent No.: US 7,825,992 B2
(45) Date of Patent: Nov. 2, 2010

(54) VIDEO PROCESSING APPARATUS AND VIDEO PROCESSING METHOD

(75) Inventors: Byung-jo Jun, Seoul (KR); Tae-hwan Cha, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1229 days.

(21) Appl. No.: 11/407,071

(22) Filed: Apr. 20, 2006

(65) Prior Publication Data

US 2007/0002155 A1    Jan. 4, 2007

(30) Foreign Application Priority Data

Jul. 4, 2005    (KR) ..................... 10-2005-0059927

(51) Int. Cl.
*H04N 5/21*    (2006.01)
*H04N 5/213*    (2006.01)
*H04N 1/409*    (2006.01)

(52) U.S. Cl. ...................... 348/627; 348/623; 348/607; 348/606; 348/622; 348/241; 382/275

(58) Field of Classification Search ............... 348/623, 348/627, 607, 606, 622, 625, 241, 252; 382/275, 382/263; 358/447, 463
See application file for complete search history.

(56) References Cited

U.S. PATENT DOCUMENTS 5,130,798 A * 7/1992 Christopher ................. 348/620

FOREIGN PATENT DOCUMENTS

| CN | 1063982 A | 8/1992 |
|---|---|---|
| EP | 0 497 222 A2 | 1/1992 |
| JP | 08-336157 | 12/1996 |
| KR | 1020030094772 A | 12/2003 |
| WO | WO 99/52274 | 10/1999 |
| WO | WO 02/056583 A3 | 7/2002 |

* cited by examiner

*Primary Examiner*—David L Ometz
*Assistant Examiner*—Jean W Désir
(74) *Attorney, Agent, or Firm*—Roylance, Abrams, Berdo & Goodman, L.L.P.

(57) ABSTRACT

A video signal processing apparatus and video processing method are provided, which can reduce an influence of noise and enhance fineness of the image. A signal division unit divides a video signal into a low frequency component and a high frequency component of the video signal. A signal eliminating unit eliminates a component within a magnitude range of noise from the high frequency component of the video signal output from the signal division unit. A signal combining unit combines the low frequency component of the video signal output from the signal division unit and the high frequency component of the video signal from which the component within the magnitude range of noise is eliminated.

8 Claims, 5 Drawing Sheets

VIDEO PROCESSING APPARATUS AND VIDEO PROCESSING METHOD

CROSS-REFERENCE TO RELATED APPLICATIONS

This application claims the benefit under 35 U.S.C. §119(a) of Korean Patent Application No. 2005-0059927, filed on Jul. 4, 2005, in the Korean Intellectual Property Office, the entire disclosure of which is hereby incorporated by reference.

BACKGROUND OF INVENTION

1. Field of Invention

The present invention relates to a video processing apparatus and a video processing method. More particularly, the present invention relates to a video processing apparatus and a video processing method which can reduce the effects of noise and enhance fineness of an image.

2. Description of the Related Art

A video processing apparatus, such as a television, receives a video signal from a broadcasting station containing specific video according to a digital television broadcasting signal, cable television broadcasting signal, and the like. The video processing apparatus performs a video-process for the received video signal and then outputs an image. The video processing apparatus also receives a video signal from various video equipment, such as, a video cassette recorder (VCR), a digital versatile disk (DVD) player, and the like. Then the video processing apparatus performs a video process for the received video signal.

The video signal received by such video processing apparatus is a frequency signal corresponding to a characteristic of the image. For example, an area in which the image is not change corresponds to a low frequency, and an area (such as a corner) in which the image is rapidly changed corresponds to a high frequency. On the other hand, a usable frequency band for the video signal received by the video processing apparatus is limited in order to enhance an efficiency of the frequency resource. For example, in a television system of the National Television System Committee, a frequency band width assigned to one channel is 6 MHz. In this frequency band width, a frequency given for expressing an image is 4.2 MHz.

However, an original image has various frequency components, such as an image which is expressed by the high frequency of 4.2 MHz or more. In this case, once the original image, having a frequency component of 4.2 MHz or more, is converted into a video signal, the frequency components are lost. As a result, problems may exist in which an area, such as a corner of the image, is not displayed clearly, and an unstable phenomenon, such as ringing, in which the image is oscillated, is generated.

In order to solve the phenomenon such as the ringing and the like, the coring process for the video signal has been conventionally suggested.

FIG. 1 is a block diagram schematically showing a structure of a coring processing unit of a conventional video processing apparatus 1. The video processing apparatus 1 of FIG. 1 is provided with a high-pass filter 11 for generating input high frequency components of an input video signal, a first mixer 12 for eliminating the high frequency component filtered by the high pass filter 11 from the input video signal and outputting a low frequency component; a coring unit 13 for performing a coring process for the high frequency component filtered by the high pass filter 11 and inputted thereto; and a second mixer 14 for adding the signal output from the coring unit 13 to the low frequency component output from the first mixer 12; and then outputting the added signal.

The coring unit 13 eliminates an unnecessary component (that is, a noise component) in the high frequency components. FIG. 2 is a graph showing a gain 15 that represents a ratio of a level of an output signal to a level of an input signal of the coring unit 13. As shown in FIG. 2, the coring unit 13 sets the gain of input signal, having a level (–a~a) below a certain range, to 0 (zero), and then eliminates the unnecessary components and outputs the signal. The coring unit 13 eliminates a section with a low signal level from the high frequency component, which causes the ringing phenomenon in the video signal, and attenuates the ringing phenomenon.

However, since the signal eliminated in the coring unit 13 comprises noise, as well as image information, the higher a threshold level (a or –a) is for preventing the ringing, the more image information is lost. Accordingly, although the ringing phenomenon is improved, a problem exists in which fineness of the image decreases.

Accordingly, there is a need for an improved video processing apparatus and video processing method that reduces noise in a video signal without decreasing fineness of an image.

SUMMARY OF THE INVENTION

An aspect of embodiments of the present invention is to address at least the above problems and/or disadvantages and to provide at least the advantages described below. Accordingly, an aspect of embodiments of the present invention is to provide a video processing apparatus and a video processing method which can reduce an influence of noise and enhance fineness of an image.

The foregoing and/or other aspects of an exemplary embodiment of the present invention can be achieved by providing a video signal processing apparatus, comprising a signal division unit dividing a video signal into a low frequency component and a high frequency component. A signal eliminating unit eliminates a component within a magnitude range of noise from the high frequency component of the video signal output from the signal division unit. A signal combining unit combines the low frequency component of the video signal output from the signal division unit and the high frequency component of the video signal from which the component within the magnitude range of noise is eliminated.

According to an aspect of an exemplary embodiment of the present invention, the signal division unit comprises a high-pass filter passing the high frequency component of the video signal. A mixer subtracts the high frequency component passed by the high-pass filter from the video signal and outputs the low frequency component of the video signal.

According to an aspect of an exemplary embodiment of the present invention, the signal eliminating unit comprises a signal classification unit classifying the high frequency component of the video signal output from the signal division unit into a component above a lower limit value of the magnitude range of noise and a component below the lower limit value. A first coring unit eliminates a component below an upper limit value of the magnitude range of noise from the component above the lower limit value of the magnitude range of noise.

According to an aspect of an exemplary embodiment of the present invention, the signal eliminating unit further comprises a second coring unit eliminating a component below a certain magnitude of noise from the component below the lower limit value of the magnitude range of noise.

The foregoing and/or other aspects of an exemplary embodiment of the present invention can be achieved by providing a video processing method comprising dividing a video signal into a low frequency component and a high frequency component of the video signal. A component within a magnitude range of noise is eliminated from the high frequency component of the video signal. The low frequency component of the video signal is combined with the high frequency component of the video signal from which the component within the magnitude range of noise is eliminated.

According to an aspect of an exemplary embodiment of the present invention, the dividing of the video signal comprises passing the high frequency component of the video signal. The high frequency component is subtracted from the video signal and the low frequency component of the video signal is output.

According to an aspect of an exemplary embodiment of the present invention, the eliminating of the component comprises classifying the high frequency component of the video signal into a component above a lower limit value of the magnitude range of noise and a component below the lower limit value. A component below an upper limit value of the magnitude range of noise is eliminated from the component above the lower limit value of the magnitude range of noise.

According to an aspect of an exemplary embodiment of the present invention, the eliminating of the component further comprises eliminating a component below a certain magnitude of noise from the component below the lower limit value of the magnitude range of noise.

BRIEF DESCRIPTION OF THE DRAWINGS

The above and other objects, features, and advantages of certain exemplary embodiments of the prevent invention will become apparent from the following description taken in conjunction with the accompany drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Hereinafter, exemplary embodiments of the present invention will be described in detail with reference to accompanying drawings.

Figure 3:
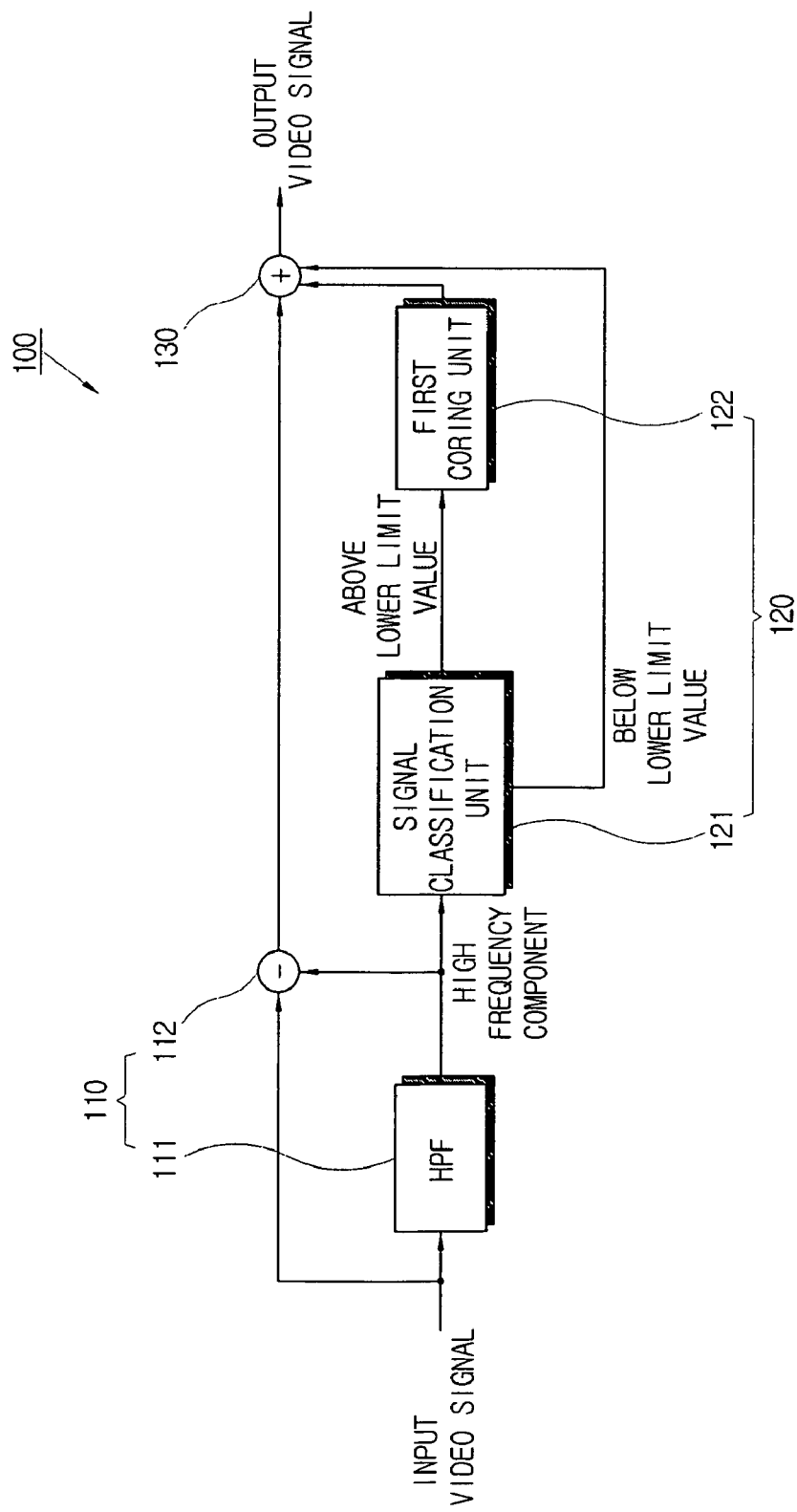
FIG. 3 is a block diagram showing a structure of a video processing apparatus according to an exemplary embodiment of the present invention.

FIG. 3 is a block diagram illustrating a structure of a video processing apparatus 100 according to an exemplary embodiment of the present invention.

The video processing apparatus 100 receives a video signal containing specific video information, such as, a digital television broadcasting signal, cable television broadcasting signal, and the like, from a broadcasting station, or receives a video signal from various video equipment, such as, a video cassette recorder (VCR), a digital versatile disk (DVD), and the like. The video processing apparatus 100 then performs a video-process for the received video signal. For example, the video processing apparatus 100, according to an exemplary embodiment of the present invention, eliminates and outputs a frequency component in an input video signal corresponding to a certain magnitude range. As a result, the video processing apparatus reduces the effects of noise and enhances fineness of the image.

The video processing apparatus 100 comprises a signal division unit 110, a signal eliminating unit 120 and a signal combining unit 130. The signal division unit 110 receives the video signal and divides the video signal into a low frequency component and a high frequency component in order to output two components. The signal division unit 110, according to an exemplary embodiment of the present invention, comprises a high-pass filter 111 and a mixer 112. The high-pass filter 111 receives the video signal and converts the signal into the high frequency component of the video signal. The high-pass filter 111 has a certain cut-off frequency. Therefore, the high-pass filter passes the component of the video signal above the cut-off frequency, and cut-off the component below the cut-off frequency. In an exemplary implementation, the cut-off frequency is determined in accordance with the frequency band of the video signal for which the coring process is performed. The mixer 112 receives the video signal and the high frequency component of the video signal passed through the high-pass filter 111, and then eliminates the high frequency component from the video signal and outputs the low frequency component of the video signal.

The signal eliminating unit 120 receives the high frequency component of the video signal output from the high pass filter 111, and eliminates a component within a certain magnitude range of noise from the video signal. The high frequency component of the video signal has a noise which causes a ringing sound. The magnitude of the noise lies within a certain magnitude range. The signal eliminating unit 120 eliminates a component corresponding to the noise within the magnitude range, from the high frequency component of the input video signal.

The signal eliminating unit 120 comprises a signal classification unit 121 and a first coring unit 122. The signal classification unit 121 classifies the high frequency component of the video signal output from the high pass filter 111, into a component above a lower limit value of the magnitude range corresponding to the noise and a component below a lower limit value. For example, the signal classification unit 121 determines whether the high frequency component of the input video signal is larger than a lower limit value of the magnitude range of noise. The signal classification unit 121 then classifies the video signal into two signals with a reference of the lower limit value.

Figure 1:
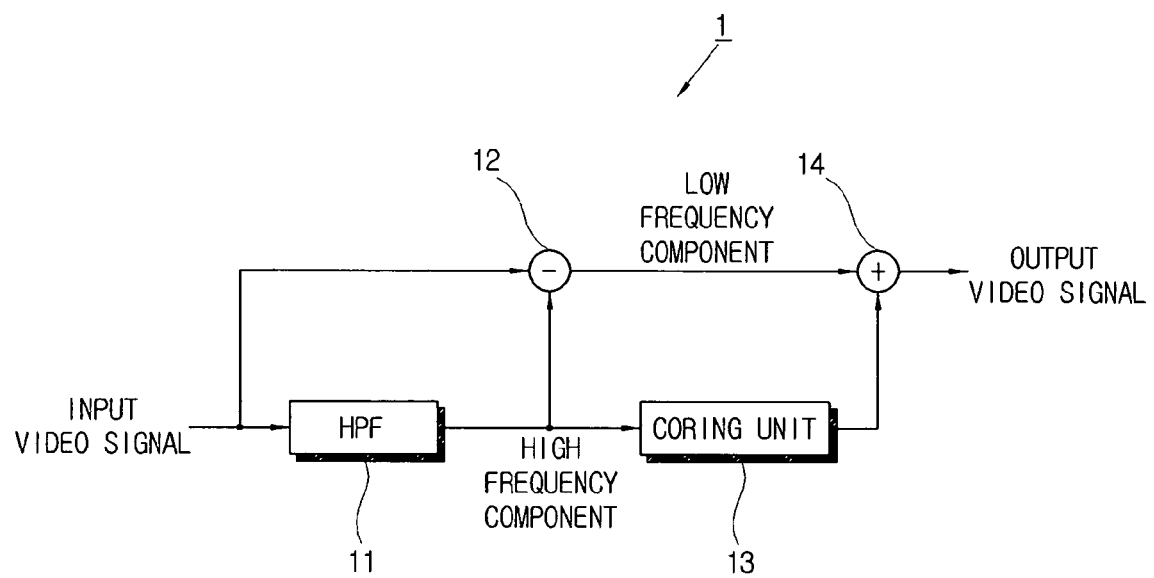
FIG. 1 is a block diagram showing schematically a structure of a coring processing unit of a conventional video signal processing apparatus.
Figure 2:
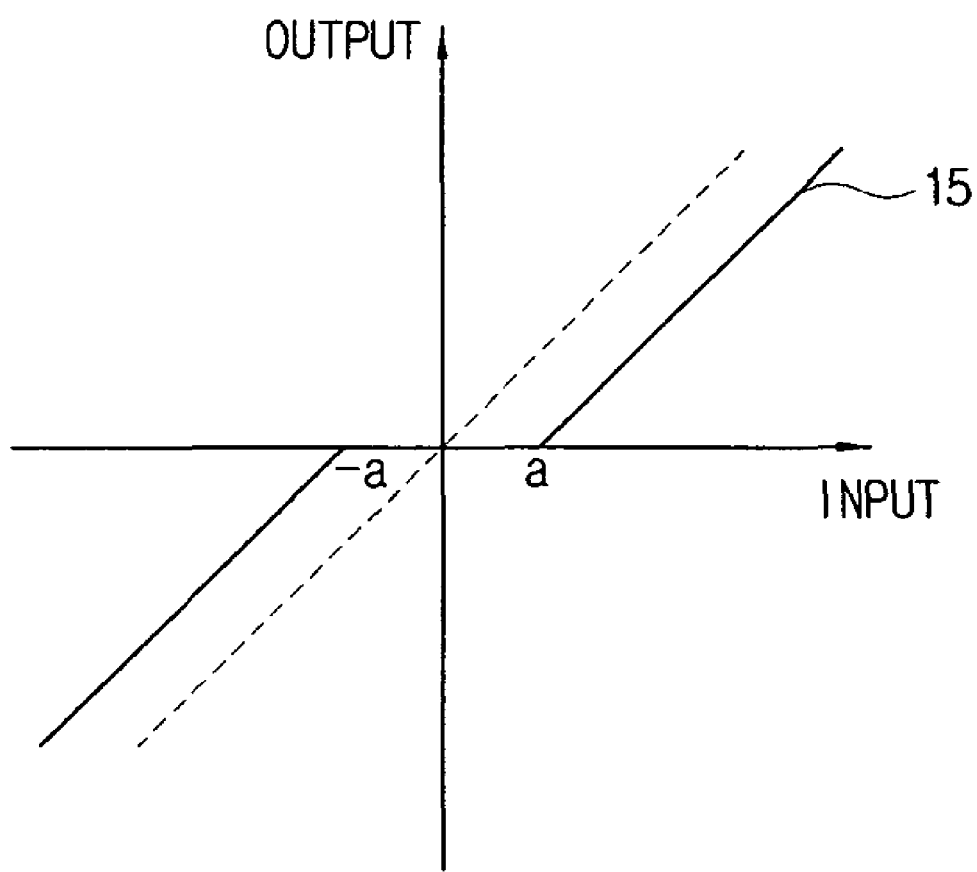
FIG. 2 is a graph showing a gain representing a ratio of a level of output signal to a level of input signal of the coring unit.

The first coring unit 122 receives the signal above a lower limit value of the magnitude range of noise, from the signal classification unit 121. The first coring unit 122 performs a coring process for the input signal and eliminates a component below an upper limit value of the magnitude range in which the noise is located. The first coring unit 122 may have a gain with a ratio of a level of the output signal to a level of the input signal, as shown in FIG. 2. An upper limit value of the magnitude range in which the noise is located may be set to the level (−a or a) in FIG. 2. The gain may also be set to a level in the first coring unit 122 that prevents the ringing sound.

That is, the signal eliminating unit 120 performs the coring process to eliminate the noise when a magnitude of the high frequency signal of the video signal corresponds to the magnitude range in which the noise is located. However, the signal eliminating unit 120 does not perform the coring process when a magnitude of the high frequency signal does not correspond to a magnitude range in which the noise is located, and outputs the signal in the signal's existing condition in order to preserve an original component of the signal. In most cases, the ringing generated in the radio frequency signal is caused by the high frequency component when the signal level is high. Therefore, only the high frequency component, corresponding to a magnitude range in which the noise is located is selectively eliminated and other components are intactly preserved. As a result, the noise can be prevented and fineness of the image can be preserved.

The signal combining unit 130 receives the low frequency component of the video signal output from the mixer 112, and the signal, from which the noise is eliminated, output from the first coring unit 122, or the signal below a lower limit value of the magnitude range of noise from the signal classification unit 121. Then, the signal combining unit combines the low frequency component (or the signal from the signal classification unit 121) and the signal from the coring unit 122, and outputs the combined signal.

Figure 4:
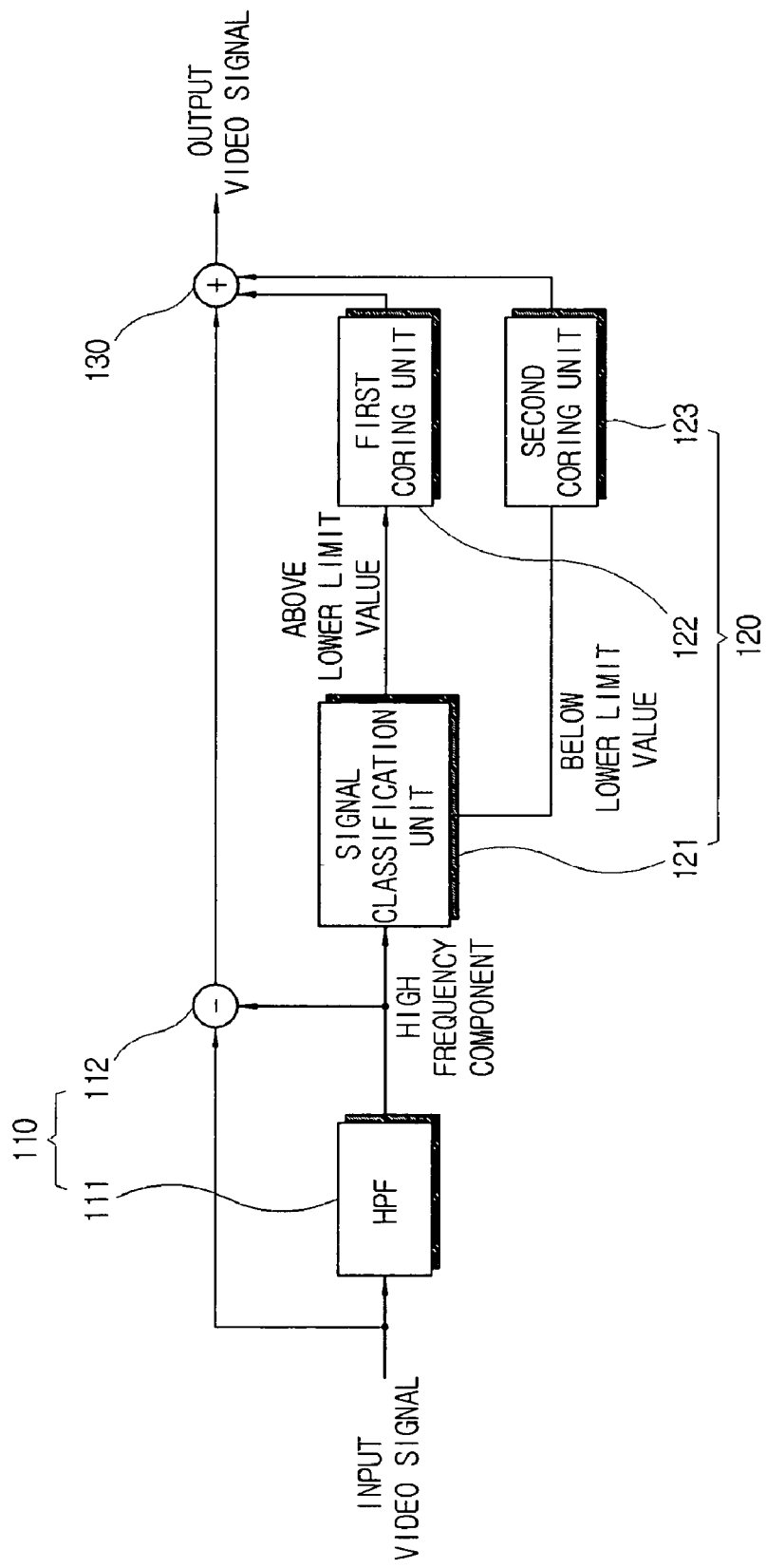
FIG. 4 is a block diagram showing a structure of a video processing apparatus according to an exemplary embodiment of the present invention.

Next, another exemplary implementation of the present invention is described below. FIG. 4 is a block diagram illustrating a main structure of a video processing apparatus 100 according to an exemplary embodiment of the present invention. In the following exemplary embodiment, a description of a structure in FIG. 4, which is same as or similar to the structure in the video processing apparatus 100 shown in FIG. 3, is omitted for clarity and conciseness. In addition to the signal classification unit 121 and the first coring unit 122, the signal eliminating unit 120 further comprises a second coring unit 123.

The second coring unit 123 receives the signal below a lower limit value of the magnitude range in which the noise is located, from the signal classification unit 121. The second coring unit 123 then performs a coring process for the input signal. The coring process eliminates the component below a certain magnitude, from the signal with the magnitude range in which the noise is located, in order to adjust fineness of the image. Similar to the first coring unit 122, the second coring unit 123 has a predetermined gain, which is a ratio of a level of the output signal to a level of the input signal. The second coring unit 123 sets a gain to the component of the input signal, having a magnitude below a specific magnitude, to zero (0) and outputs the component. Accordingly, the gain of the second coring unit 123 is determined in accordance with the fineness of the image.

The signal combining unit 130 receives the low frequency component of the video signal output from the mixer 112 and the signal, from which the noise is eliminated, output from the first coring unit 122, or the signal, in which the fineness of the image is adjusted, output from the second coring unit 123.

The signal combining unit 130 combines the low frequency component (or the signal output from the coring unit 122) and the signal output from the second coring unit 123 and outputs the combined signal.

Figure 5:
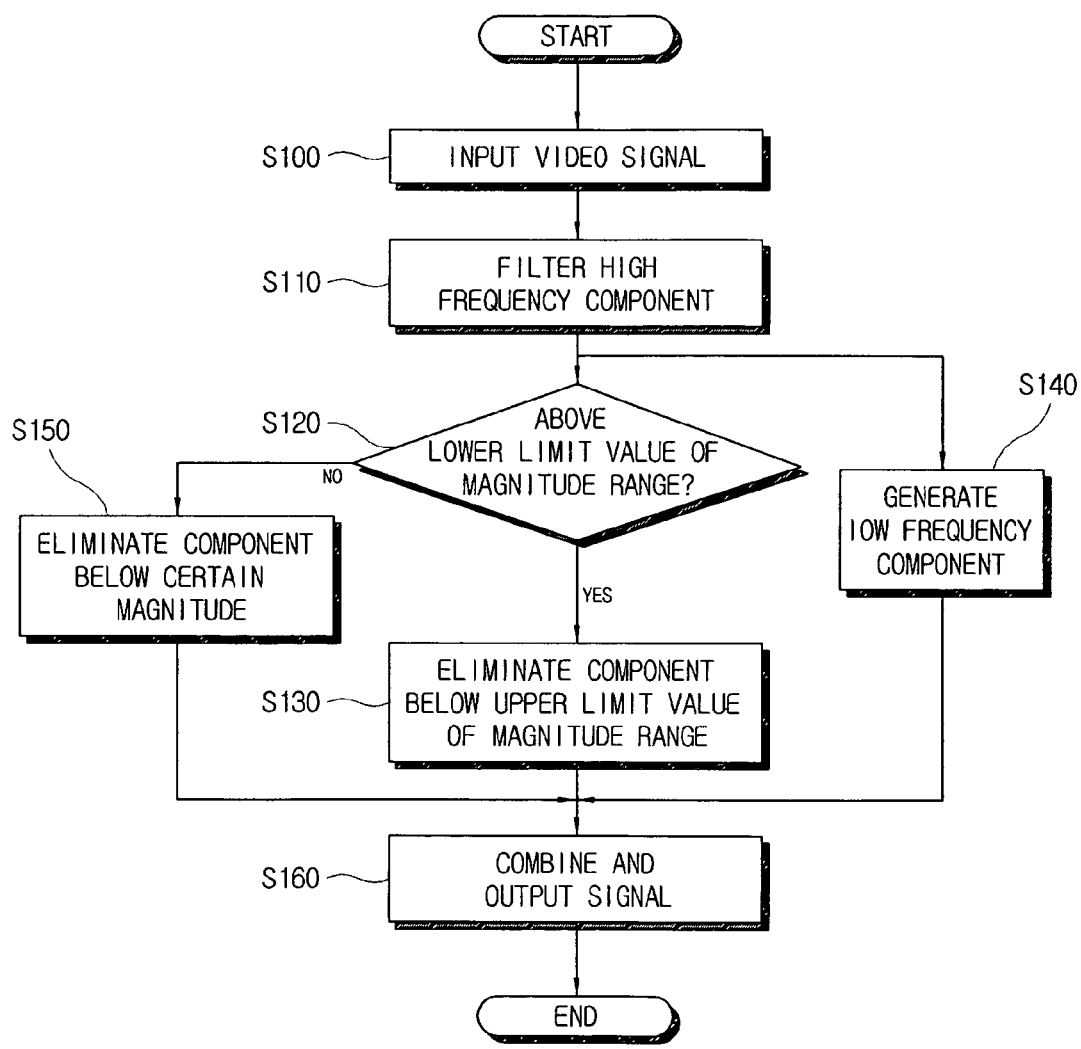
FIG. 5 is a flow chart schematically showing an operation of the video processing apparatus according to an exemplary embodiment of the present invention.

An operation of the signal processing apparatus 100 according to an exemplary embodiment of the present invention is described below. FIG. 5 is a flow chart schematically explaining an operation of the video processing apparatus 100 according to an exemplary embodiment of the present invention.

The video signal, which is video-processed, is input to the signal division unit 110 at operation S100. The high pass filter 111 cuts-off a low frequency component of the video signal, in accordance with a certain cut-off frequency, and outputs a high frequency component at operation S100. The mixer 112 eliminates the output high frequency component from the video signal in order to generate and output the low frequency component, at operation S140.

The signal classification unit 121 of the signal eliminating unit 120 determines whether a signal magnitude of the high frequency component of the input video signal is larger than the lower limit value of a magnitude range corresponding to a certain noise, at operation S120.

If the signal magnitude of the high frequency component is larger than the lower limit value, the first coring unit 122 eliminates the signal, having a magnitude below an upper limit value of the magnitude range of noise, from the signal which is determined as the signal having a magnitude above the lower limit value with an upper limit value of the magnitude range of the noise as the cut-off level, at operation S130.

If a signal magnitude of the high frequency component of the video signal is less than the lower limit value, the signal classification unit 121 outputs the video signal, in the signal's existing condition, to the signal combining unit 130. On the other hand, the second coring unit 123, according to an exemplary embodiment of the present invention, eliminates the signal below a certain magnitude from the signal having a magnitude below the lower limit value with a certain magnitude as the cut-off level in order to adjust fineness of the image, at operation S150.

The signal combining unit 130 adds the signal, from which the noise is eliminated, output from the first coring unit 122, or the signal below the lower limit value of the magnitude range in which the noise is located, from the signal classification unit 121, to the low frequency component of the video signal output from the mixer 112 and outputs these signals, at operation S160.

In an exemplary implementation, the signal combining unit 130 may add the signal, from which the noise is eliminated, output from the first coring unit 122, or the signal, in which the fineness of the image is adjusted, output from the second coring unit 123, to the low frequency component of the video signal output from the mixer 112. The added signal is then output, at operation S160.

The video processing apparatus 100 of an exemplary embodiment of the present invention may comprise a television system, or the like. Also, the video processing apparatus 100 may comprise a deinterlacer, a scaler, and the like, in the television system, provided for enhancing a quality of the image obtained by a decoding luminance signal.

Exemplary embodiments of the present invention as described above can provide a video processing apparatus and video processing method which can reduce the effects of noise and enhance fineness of an image.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A video signal processing apparatus, comprising:
a signal division unit for dividing a video signal into a low frequency component and a high frequency component of the video signal;
a signal eliminating unit for classifying the high frequency component of the video signal into a first component signal below a lower limit value of a first magnitude range of noise and a second component signal above the lower limit value of the first magnitude range of noise, and eliminating a component below an upper limit value of the first magnitude range of noise from the second component signal to output a third component signal; and
a signal combining unit for combining the low frequency component of the video signal outputted from the signal division unit, either the first component signal or a fourth component signal derived from the first component signal, and the third component signal.

2. The video processing apparatus according to claim 1, wherein the signal division unit comprises:
a high-pass filter for passing the high frequency component of the video signal; and
a mixer for subtracting the high frequency component passed by the high-pass filter from the video signal and outputting the low frequency component of the video signal.

3. The video processing apparatus according to claim 1, wherein the signal eliminating unit comprises:
a signal classification unit for classifying the high frequency component of the video signal into the first component signal and the second component signal; and
a first coring unit for eliminating a component below the upper limit value of the first magnitude range of noise from the second component signal.

4. The video processing apparatus according to claim 3, wherein the signal eliminating unit further comprises a second coring unit for eliminating a component below a second magnitude of noise from the first component signal to output the fourth component signal.

5. A video processing method comprising:
dividing a video signal into a low frequency component and a high frequency component;
classifying the high frequency component of the video signal into a first component signal below a lower limit value of a first magnitude range of noise and a second component signal above the lower limit value of the first magnitude range of noise, and eliminating a component below an upper limit value of the first magnitude range of noise from the second component signal to output a third component signal; and
combining the low frequency component of the video signal, either the first component signal or a fourth component signal derived from the first component signal, and the third component signal.

6. The video processing method according to claim 5, wherein the step of dividing the video signal comprises:
passing the high frequency component of the video signal;
subtracting the high frequency component from the video signal; and
outputting the low frequency component of the video signal.

7. The video processing method according to claim 5, wherein the step of eliminating the component comprises:
classifying the high frequency component of the video signal into the first component signal and the second component signal; and
eliminating a component below the upper limit value of the first magnitude range of noise from the second component signal.

8. The video processing method according to claim 7, wherein the eliminating of the component further comprises eliminating a component below a second magnitude of noise from the first component signal to output the fourth component signal.

* * * * *